(12) United States Patent
Cook et al.

(10) Patent No.: US 8,032,556 B1
(45) Date of Patent: Oct. 4, 2011

(54) SYSTEMS AND METHODS FOR USER PROFILE DATA DELIVERY

(75) Inventors: Randall R. Cook, Springville, UT (US); Jeremy Hurren, Pleasant Grove, UT (US)

(73) Assignee: Symantec Corporation, Mountain View, CA (US)

( * ) Notice: Subject to any disclaimer, the term of this patent is extended or adjusted under 35 U.S.C. 154(b) by 548 days.

(21) Appl. No.: 12/044,633

(22) Filed: Mar. 7, 2008

(51) Int. Cl.
*G06F 17/30* (2006.01)
*G06F 7/00* (2006.01)
*G06F 3/00* (2006.01)

(52) U.S. Cl. .................. 707/783; 707/732; 715/745

(58) Field of Classification Search ........... 707/999.001, 707/999.003, 999.005, 999.007, 783, 732; 726/4; 709/203, 217, 225; 715/745
See application file for complete search history.

(56) References Cited

U.S. PATENT DOCUMENTS

| | | | | |
|---|---|---|---|---|
| 7,725,842 B2 * | 5/2010 | Bronkema | | 715/866 |
| 2004/0181683 A1 * | 9/2004 | Jia et al. | | 713/200 |
| 2004/0254827 A1 * | 12/2004 | Hind et al. | | 705/10 |
| 2008/0162537 A1 * | 7/2008 | Mancini | | 707/102 |
| 2008/0199042 A1 * | 8/2008 | Smith | | 382/100 |
| 2008/0288484 A1 * | 11/2008 | Bouzid et al. | | 707/5 |
| 2009/0082292 A1 * | 3/2009 | Al-Mahmood | | 514/44 |
| 2009/0100047 A1 * | 4/2009 | Jones et al. | | 707/5 |
| 2009/0172160 A1 * | 7/2009 | Klein | | 709/225 |
| 2009/0216563 A1 * | 8/2009 | Sandoval et al. | | 705/3 |
| 2009/0234711 A1 * | 9/2009 | Ramer et al. | | 705/10 |
| 2009/0300509 A1 * | 12/2009 | Mathew et al. | | 715/739 |
| 2010/0115429 A1 * | 5/2010 | Ohura et al. | | 715/760 |

* cited by examiner

*Primary Examiner* — Vincent Boccio
*Assistant Examiner* — Bao Tran
(74) *Attorney, Agent, or Firm* — Advantedge Law Group

(57) ABSTRACT

Systems and methods for delivery of user profile data are disclosed. An exemplary method includes detecting a request for a full copy of a user profile data package maintained by a user profile data source subsystem, creating an illusion that the request has been fulfilled, and copying on demand a portion of the user profile data package from the source subsystem to a target location for access by a data consuming subsystem. In certain embodiments, the method further includes utilizing the copied portion of the user profile data package for execution of a computing operation, without fully copying the user profile data package from the source subsystem. In certain embodiments, the portion of the user profile data package is streamed from the source subsystem to the target location over a network connection.

15 Claims, 9 Drawing Sheets

SYSTEMS AND METHODS FOR USER PROFILE DATA DELIVERY

BACKGROUND INFORMATION

Many computer operating systems are configured to support multiple recognized users. In such systems, a unique user profile including user profile data is typically created and maintained for each user. User profile data may include system files, display preferences and images (e.g., display settings, screen colors, screen background images, icons, desktop shortcuts), permissions settings, application data, user-specific registry keys, network and printer connection settings, hardware (e.g., keyboard and mouse) settings, and any user files (e.g., photos, audio files, text documents, etc.) included in a user's profile directory. It is not uncommon for a user profile to be quite large and require significant computing resources to store and copy.

When a user logs on to such an operating system, a conventional copy process is called and executed to copy the user profile data associated with the user's profile from where it is maintained to one or more target locations (e.g. a local computing device, cache, or other data store) to make the user profile data available to the operating system, applications running on the operating system, and/or the user. Traditionally, the operating system, applications running on the operating system, and/or the user are forced to wait for the copy process to fully copy all of the user profile data associated with a user profile before certain computing operations can be performed. For example, a desktop view associated with the user profile will not be displayed until the copy process has finished copying all of the user profile data in a user profile and signaled that the copying is completed. Unfortunately, fully copying the user profile data can lead to slow and significantly delayed user logon experiences, especially when the user profile includes a large amount of user profile data and/or when copying the user profile data includes transmission over a network connection.

When the user logs off of the operating system, the previously copied user profile data and any changes to the copied user profile data are copied in the reverse direction in order to propagate any updates made to the copied user profile data to the stored user profile data. Again, the conventional copy process will fully copy all of the user profile data before other computing operations can be performed. This can cause slow and delayed user logoff experiences, especially when the user profile includes a large amount of user profile data.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
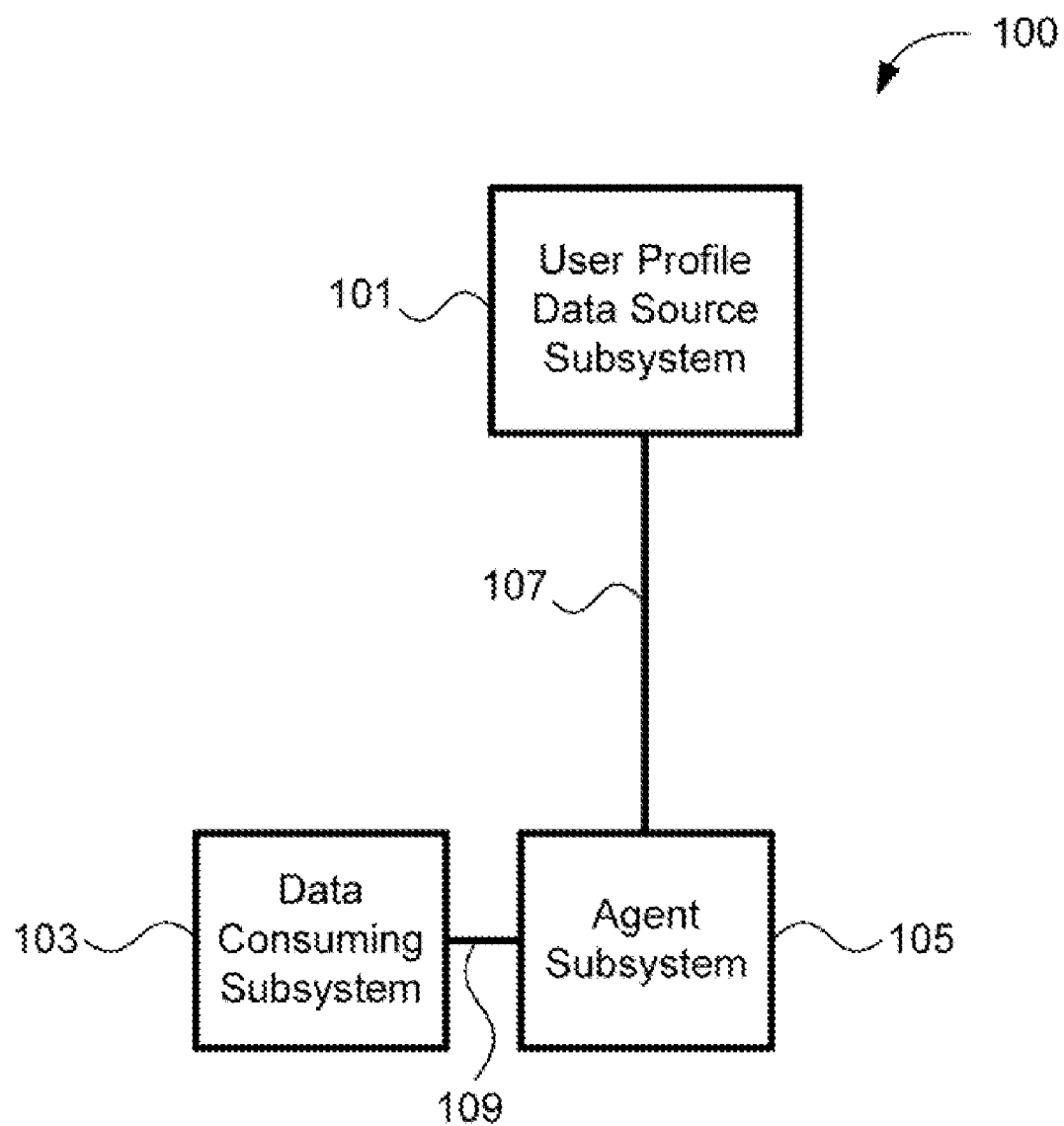
FIG. 1 illustrates an exemplary system for user profile data delivery.

The disclosure is directed to user profile data delivery. The examples disclosed herein may be implemented in numerous ways, including as one or more processes, apparatuses, systems, devices, methods, computer readable media, or computer program products embodied on computer readable media. Exemplary systems, subsystems, apparatuses, computer program products embodied on computer readable media, and methods for user profile data delivery are described herein.

As used herein, the term "user profile data" or "user profile data package" may refer broadly to a set of computer readable data specific to a particular user profile. User profile data may include system files, display preferences and images (e.g., display settings, screen colors, screen background images, icons, desktop shortcuts), permissions settings, application data, user-specific registry keys, network and printer connection settings, hardware (e.g., keyboard and mouse) settings, and any user files (e.g., photos, audio files, text documents, etc.) included in a user's profile directory.

In certain embodiments, user profile data, e.g., at least one user profile data package, may be maintained by a user profile data source subsystem. Portions of a user profile data package may be copied on demand (i.e., on an "as needed basis") from the source subsystem to one or more target locations for access by a data consuming subsystem, which may be configured to utilize the copied portions of user profile data for execution of one or more computing operations. In certain embodiments, copying a portion of a user profile data package on demand may include streaming data representing the portion of the user profile data package from the source subsystem to a target location accessible to the data consuming subsystem.

On-demand copying of portions of a user profile data package may be used to eliminate, or at least reduce, instances of having to fully copy the user profile data package before being able to perform certain computing operations, including user logon operations, for instance. By utilizing selective, on-demand copying of portions of a user profile data package, one or more computing operations dependent on data in a user profile data package may be performed without the user profile data package being copied in full. For example, when a user logs on to an operating system of a computing device, a portion of the user's user profile data package may be copied on demand to a target location accessible to the operating system. One or more logon operations (e.g., displaying the user's desktop) dependent on the copied portion of the user profile data may be performed, without the operating system having to wait for the entire user profile data package to be copied before performing the logon operation(s). Accordingly, user logon operations may be performed quickly and efficiently even when a user profile data package is very large in size.

One or more other portions of the user's user profile data package may be similarly copied on demand as needed for other computing operations. For example, a user may attempt to open a particular file included in the user's profile data package. A file access request associated with the attempt may be detected and the file requested and copied on demand for use in fulfilling the operation.

Turning now to the figures, FIG. 1 illustrates an exemplary system 100 for user profile data delivery. As shown, system 100 may include a user profile data source subsystem 101, a data consuming subsystem 103, and an agent subsystem 105.

Each of the subsystems 101, 103, 105 may include or be implemented on any computer hardware or as instructions (e.g., software programs) embodied on computer readable media, or combinations of instructions and hardware, configured to perform the processes described herein. In particular, it should be understood that system 100 may include or be implemented on any of a number of well-known computing devices, and may employ any of a number of well-known computer operating systems, including, but by no means limited to, known versions and/or varieties of Microsoft Windows, UNIX, Macintosh, and Linux operating system software. Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of the computer. Transmission media may include or convey acoustic waves, light waves, and electromagnetic emissions, such as those generated during radiofrequency ("RF") and infrared ("IR") data communications. Common forms of computer readable media include, for example, a floppy disk, a flexible disk, hard disk, magnetic tape, or any other magnetic medium, a CD-ROM, DVD, any other optical medium, punch cards, paper tape, any other physical medium with patterns of holes, a RAM, a PROM, an EPROM, a FLASH-EEPROM, any other memory-chip or cartridge, or any other medium from which a computer can read.

Subsystems 101, 103, and 105 may be configured to communicate with one another using any suitable communication technologies, including suitable network communication technologies, devices, signals, interfaces, and protocols capable of supporting the processes and communications described herein. As shown in FIG. 1, the user profile data source subsystem 101 may be communicatively coupled to the agent subsystem 105 by way of a connection 107, and the data consuming subsystem 103 may be communicatively coupled to the agent subsystem 105 by way of a connection 109. Connection 107 and/or connection 109 may include any suitable data transmission media and/or interfaces configured to connect two or more electronic devices and/or computing processes, including any well known or other suitable data transmission media and/or interfaces.

Figure 2:
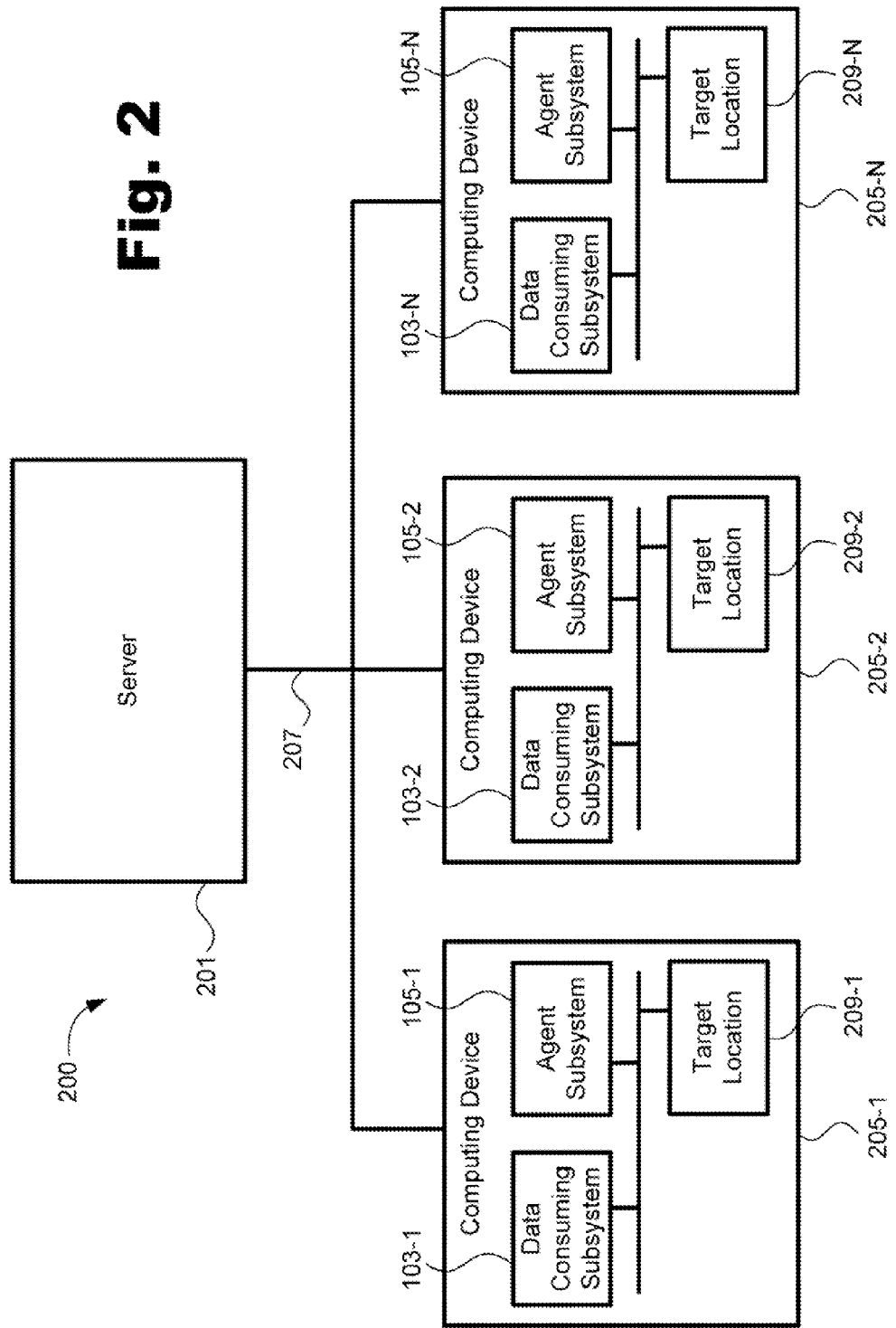
FIG. 2 illustrates an exemplary implementation of a system for user profile data delivery.

FIG. 2 illustrates an exemplary implementation 200 of system 100. The implementation 200 shown in FIG. 2 is illustrative only. Other implementations, components, and configurations may be employed in other embodiments.

In implementation 200, user profile data source subsystem 101 may include or be implemented on at least one server 201, which may be communicatively coupled to one or more computing devices 205-1 through 205-N (collectively "computing devices 205") by way of one or more network connections 207. Network connection 207 may include, but is not limited to, a local area network (LAN) connection, a wide area network (WAN) connection, a wireless network connection, a virtual private network connection, an intranet connection, an Internet connection, any other suitable network connection, or any combination or sub-combination thereof.

As shown in FIG. 2, data consuming subsystem 103 and agent subsystem 105 may be implemented within a computing device 205. FIG. 2 shows data consuming subsystem 103-1 and agent subsystem 105-1 implemented on computing device 205-1, data consuming subsystem 103-2 and agent subsystem 105-2 implemented on computing device 205-2, and data consuming subsystem 103-N and agent subsystem 105-N implemented on computing device 205-N.

Data consuming subsystem 103 and agent subsystem 105 may be communicatively coupled to one another in any suitable way, including by having access to a common computer readable medium. For example, data consuming subsystem 103 and agent subsystem 105 may have shared access to a target location 209 of a computer readable medium (e.g., a local data store). FIG. 2 shows target locations 209-1, 209-2, and 209-N within computing devices 205-1, 205-2, and 205-N, respectively. Accordingly, agent subsystem 105 may direct that user profile data be copied on demand from server 201 and stored to target location 209 for access by data consuming subsystem 103, as described below.

When implemented as shown in FIG. 2, system 100 may be configured for selective, on-demand copying of one or more portions of user profile data over connection 207 from the user profile data source subsystem 101 to one or more target locations 209-1 through 209-N for access and use by the respective data consuming subsystems 103-1, 103-2, and 103-N. User profile data source subsystem 101 may be configured to receive requests from computing devices 205 for portions of user profile data and to provide data representative of copies of the portions of user profile data in response to the requests.

User profile data source subsystem 101 may be configured to store user profile data (e.g., one or more user profile data packages) for one or more user profiles, such as user profiles associated with users and/or potential users of computing devices 205. In certain embodiments, implementation 200 may be configured to support "roaming user profiles" to allow users to log on and have access to their respective user profiles using different computing devices 205.

Figure 3:
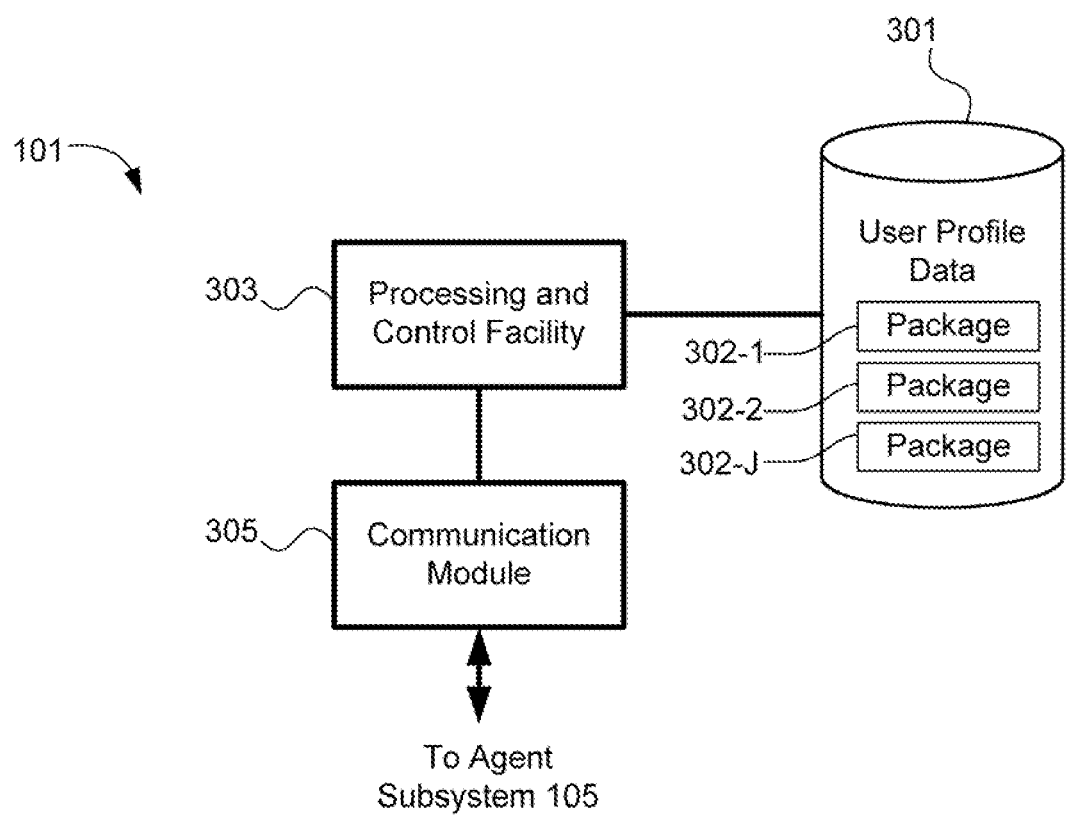
FIG. 3 illustrates components of an exemplary user profile data source subsystem.

FIG. 3 illustrates exemplary components of user profile data source subsystem 101. The components shown in FIG. 3 are illustrative only. Other components and configurations may be employed in other embodiments.

As shown in FIG. 3, the user profile data source subsystem 101 may include a data store 301 configured to electronically store user profile data. Data store 301 may include one or more data storage media, devices, or configurations and may employ any type, form, and combination of storage media. For example, the data store 301 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof.

In the example shown in FIG. 3, data store 301 includes a plurality of user profile data packages 302-1 through 302-J (collectively "user profile data packages 302"), each of which may be associated with a particular user profile. Each of the user profile data packages 302 includes, or can be divided into, discrete portions of user profile data. In certain embodiments, for example, a user profile data package 302 includes a plurality of electronic files and/or groupings of files associated with a particular user profile.

As shown in FIG. 3, user profile data source subsystem 101 may further include a processing and control facility 303 communicatively coupled to the data store 301. Processing and control facility 303 may be configured to perform one or more operations for processing user profile data, including storing user profile data to the data store 301 and modifying, partitioning, deleting, accessing, searching, and retrieving user profile data stored in the data store 301. Processing and control facility 303 may be configured to access particular portions of user profile data and operate on the portions independently of other user profile data stored in the data store 301.

In certain embodiments, processing and control facility 303 may be configured to create representations of data included in a user profile data package 302. For example, processing and control facility 303 may identify information related to user profile data and utilize the information to create "shell data" for a user profile data package 302. Shell data may include any information descriptive of user profile data, including directory and file information, for example. The shell data typically includes such file and directory information but omits the actual contents of the files. As described further below, agent subsystem 105 may be configured to utilize the shell data for operations associated with on-demand portion-by-portion copying of user profile data.

User profile data source subsystem 101 may further include a communication module 305 communicatively coupled to the processing and control facility 303 and configured to communicate with agent subsystem 105. The communication module 305 may include any communication hardware and/or software that may suit a particular application, including, but not limited to, modulators, demodulators, wireless communication devices, network modems, optical communication devices, network cable, jacks, ports, and the like. It will be understood that any suitable modulation scheme and/or communication protocol may be employed in conjunction with the communication module 305 for transmitting and receiving data to/from the agent subsystem 105, as may suit a particular application. In implementation 200, communication module 305 may be configured to communicate with computing devices 205 over network connection 207.

The user profile data source subsystem 101 may be configured to receive a request for one or more portions of a user profile data package 302 from the agent subsystem 105. The request may be received through the communication module 305 and processed by the processing and control facility 303. In response to the request, the processing and control facility 303 may identify one or more portions of a user profile data package 302 based on the request, retrieve the identified portion(s) of user profile data from the data store 301, and initiate transmission of a copy of the retrieved portion(s) of user profile data to the agent subsystem 105. The communication module 305 may transmit one or more signals carrying the copied portion(s) of the user profile data package to the agent subsystem 105 by way of connection 107.

In certain embodiments, the copying of a portion of a user profile data package 302 from the user profile data source subsystem 101 to the agent subsystem 105 may include "streaming" the portion of the profile data package 302. Any suitable streaming technologies may be employed to stream portions of a user profile data package 302. Streaming technologies can be utilized to enable the data consuming subsystem 103 to perform one or more computing operations dependent on the portion data without having to wait to receive a full copy of a user profile data package 302 associated with a user profile. Other suitable ways of copying portions of user profile data on demand may be utilized in other embodiments.

By providing a portion of a user profile data package 302 in response to a request from agent subsystem 105, the user profile data source subsystem 101 may be said to selectively provide or copy the portion of the user profile data package 302 on demand. Accordingly, user profile data can be provided (e.g., streamed) and utilized for computing operations portion-by-portion, without having to wait for a full copy of a user profile data package 302 associated with a user profile to be copied.

Data consuming subsystem 103 may be configured to utilize one or more copied portions of user profile data to execute, or at least initiate execution of, one or more computing operations dependent on the copied portion(s). Data consuming subsystem 103 may include or be implemented on one or more computing devices, such as computing device 205, and may be configured to utilize profile data for execution of one or more computing operations on the computing device 205. Data consuming subsystem 103 may include any computing operation, operating system, application (e.g., computer software program) or other instructions embodied on a computer readable medium, process, function call, or data access request that is dependent on user profile data. In certain examples, data consuming subsystem 103 may include one or more user logon operations (e.g., user profile desktop rendering and display operations) associated with logging a user on to an operating system running on a computing device 205.

Figure 4:
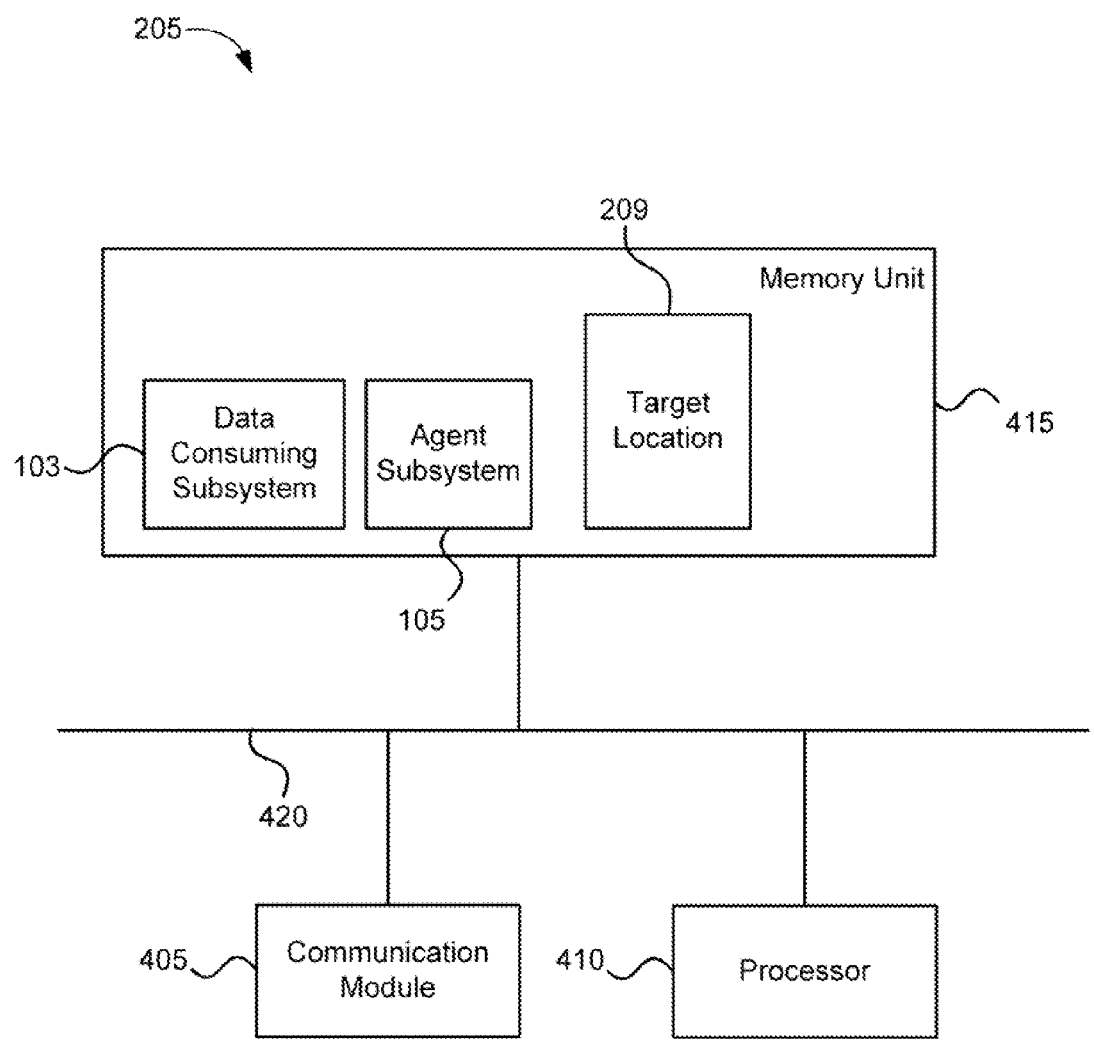
FIG. 4 illustrates components of an exemplary computing device environment.

Agent subsystem 105 may include or be implemented on one or more computing devices, such as computing device 205, and may be configured to control on-demand copying of portions of user profile data. FIG. 4 illustrates an exemplary computing device environment including data consuming subsystem 103 and agent subsystem 105 implemented within a computing device 205. The implementation shown in FIG. 4 is illustrative only. Other implementations and components may be employed in other embodiments.

As shown in FIG. 4, computing device 205 may include a communication module 405, processor 410, and memory unit 415 communicatively connected to one another by a connection 420. Connection 420 may include and/or employ any suitable communication technologies (e.g., a bus) for communicatively connecting the communication module 405, processor 410, and memory unit 415.

Communication module 405 may be configured to communicate with the user profile data source subsystem 101 and may include any communication hardware and/or software for such communications, including, but not limited to, modulators, demodulators, wireless communication devices, network modems, optical communication devices, network cable, jacks, ports, and the like. It will be understood that any suitable modulation scheme and/or communication protocol may be employed in conjunction with the communication module 405 for transmitting and receiving data to/from the user profile data source subsystem 101, as may suit a particular application. For example, communication module 405 may be configured to transmit requests from the computing device 205 to the user profile data source subsystem 101 and to receive transmissions including copies of portions of user profile data from the user profile data source subsystem 101. In implementation 200, communication module 405 may be configured to communicate with user profile data source subsystem 101 over network connection 207.

Processor 410 may be configured to perform any of the computing device 205 operations described herein, including operations initiated and/or directed by data consuming subsystem 103 and/or agent subsystem 105.

Memory unit 415 may include one or more data storage media, devices, or configurations and may employ any type, form, and combination of storage media. For example, memory unit 415 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof.

As shown in FIG. 4, memory unit 415 may include data consuming subsystem 103 and agent subsystem 105, which may comprise, in certain embodiments, computing instructions embodied in memory unit 415. Memory unit 415 may further include a target location 209 to which copied user profile data received from the user profile data source subsystem 101 may be stored for access by data consuming subsystem 103.

As mentioned, agent subsystem 105 may be configured to control on-demand copying of portions of user profile data from the user profile data source subsystem 101 to target location 209 for access by the data consuming subsystem 103. In certain embodiments, agent subsystem 105 may be configured to detect and intercept requests for user profile data maintained by the user profile data source subsystem 101. As an example, data consuming subsystem 103 may include a standard operating system user profile data copy process (e.g., a Windows operating system copy process) configured to control copying of user profile data, including controlling copying of user profile data for user logon and logoff events. A user associated with a user profile may attempt to log on to an operating system of computing device 205. The operating system may recognize the logon attempt and call and pass processing control to the copy process for copying a user profile data package 302 associated with the user profile from the user profile data source subsystem 101. Conventionally, such a copy process requests and copies the entire user profile data package 302 in full before relinquishing control to other computing operations. Accordingly, performance of certain computing operations is delayed until the user profile data package 302 is copied in full and the copy process relinquishes control. For instance, when the user attempts to log on, the desktop view associated with the corresponding user profile may not be displayed until after the user profile data package 302 is fully copied from the user profile data source subsystem 101 to target location 209. This delay can be significant when the user profile data package includes a large amount of data.

Agent subsystem 105 may be configured to detect and intercept a request from the data consuming subsystem 103 for a copy of a user profile data package 302. For instance, where the data consuming subsystem 103 includes an operating system copy process, and the copy process has initiated a request for a copy of a user profile data package 302 from the user profile data source subsystem 101 (e.g., as part of user logon operations) as described above, agent subsystem 105 may detect and intercept the request.

Agent subsystem 105 may be configured to detect the request in any suitable way, including detecting predetermined events, processes, and function calls, such as a logon request or the operating system initiating the copy process. In certain embodiments, at least part of the agent subsystem 105 may be implemented at an OS kernel level. For example, a filter driver configured to detect certain events (e.g., requests for user profile data) may be implemented at the OS kernel level and used to monitor for and detect the events.

Agent subsystem 105 may be configured to intercept the request to stop it from being received by the user profile data source subsystem 101. The request may be intercepted in any suitable way, including blocking its transmission. Accordingly, data consuming subsystem 103 does not establish direct communication with the user profile data source subsystem 101, and the user profile data source subsystem 101 does not receive a request from the data consuming subsystem 103 for a full copy of a user profile data package 302.

In response to detecting a request for a user profile data package 302, agent subsystem 105 may create an illusion that the requested user profile data package 302 has been fully copied from the user profile data source subsystem 101 to target location 209 and is available for utilization by the data consuming subsystem 103. As one example of creating such as illusion, agent subsystem 103 may provide a message to the data consuming subsystem 103 (e.g., to an operating system copy process) deceptively indicating that the entire user profile data package 302 has been fully copied and is available for use. In certain embodiments, the deceptive indication may be provided in the form of an application programming interface ("API") falsely confirming that the user profile data package 302 has been fully copied. The deceptive indication may be in any suitable form for spoofing the data consuming subsystem 103 such that the data consuming subsystem 103 functions as if the full copy process is complete (e.g., indicating that there is no user profile data to be copied).

In certain embodiments, agent subsystem 105 may be configured to request and receive shell data for the user profile data package. As mentioned above, shell data may refer to information about the user profile data package, including, but not limited to, file and directory information (e.g., dummy files). Shell data may be received from the user profile data source subsystem 101 and stored to target location 209 such that from the perspective of the data consuming subsystem 103, it is as if the entire contents of the user profile data package 302 have been copied to the target location 209. Accordingly, shell data may be used in creating the illusion that the user profile data package 302 has been fully copied. Agent subsystem 105 may be configured to request the shell data from the user profile data source subsystem 101, which may be configured to provide a copy of the shell data without providing the associated content, as described above.

The illusion may facilitate the copy process relinquishing processing control, and the data consuming subsystem 103 may continue processing computing operations and/or initiate new computing operations as if the user profile data package 302 had been successfully copied in full. In this or other suitable manner, the agent subsystem 105 may spoof the copy process into functioning as if the entire user profile data package 302 has been fully copied, without the entire user profile data package 302 actually having been copied. Accordingly, computing operations such as user logon operations can be performed without having to wait for the user profile data package 302 to be copied in its entirety.

As computing operations are initiated and executed, data consuming subsystem 103 may provide one or more access requests for copied user profile data upon which the computing operations depend. Agent subsystem 105 may be configured to detect such access requests for copied user profile data and fetch the requested portions of user profile data on demand from the user profile data source subsystem 101. As an example, after an illusion is created that a user profile data package 302 has been fully copied to target location 209, data consuming subsystem 103 may initiate or continue executing a particular computing operation (e.g., a user logon operation such as rendering a user desktop view and/or requesting a particular user profile data file) that is dependent on a portion (e.g., a particular file) of the user profile data package 302. The computing operation may generate an access request for the portion of the user profile data package 302. Agent subsystem 105 may detect and intercept the access request. The detection may be accomplished in any suitable manner. For example, agent subsystem 105 may be configured to detect requests for certain data and/or data associated with certain locations (e.g., target location) and/or processes. In certain embodiments, agent subsystem 105 may create a record descriptive of shell data received from the user profile data source subsystem 101 and utilize the record to detect access requests for shell data content.

In response to detecting an access request for a portion of a user profile data package 302, agent subsystem 105 may fetch a copy of the requested portion of the user profile data package 302 from the user profile data source subsystem 101. The user profile data source subsystem 101 may provide (e.g., stream) a copy of the requested portion as described above, and the agent subsystem 105 may store the copy of the requested portion to the target location 209, which copy may be used to fulfill the access request, thereby allowing execution of the computing operation to continue, without the entire user profile data package 302 being copied from the user profile data source subsystem 101. Agent subsystem 105 may be configured to assume processing control and/or communicate with the data consuming subsystem 103 to provide sufficient time to fetch and store a copy of the portion of the user profile data package such that the copied portion of the user profile data package 302 can be used to fulfill the access request.

As a specific example related to a user logon request, agent subsystem 105 may create an illusion as described above. Data consuming subsystem 103 may suppose that the entire user profile data package 302 has been copied and is now accessible at target location 209. Data consuming subsystem 103 may continue performing user logon operations, which may include accessing one or more files (e.g., icon images) for inclusion in a display of a user profile desktop view. To this end, data consuming subsystem 103 may generate an access request for a first user profile data file. Agent subsystem 105 may intercept the access request, fetch the requested file from the user profile data source subsystem 101, and store the copied file to target location 209 for use in fulfilling the access request. Data consuming subsystem 103 may generate another access request for a second user profile data file. Agent subsystem 105 may intercept the access request, fetch the requested second file from the user profile data source subsystem 101, and store the copied second file to target location 209 for use in fulfilling the access request. In this or similar manner, agent subsystem 105 may control selective, on-demand portion-be-portion copying of user profile data from the user profile data source subsystem 101 to fulfill access requests generated by data consuming subsystem 103. Data consuming subsystem 103 may be configured to access and utilize the copied portions of the user profile data package 302 at target location 209 for execution of one or more computing operations.

Figure 5A:
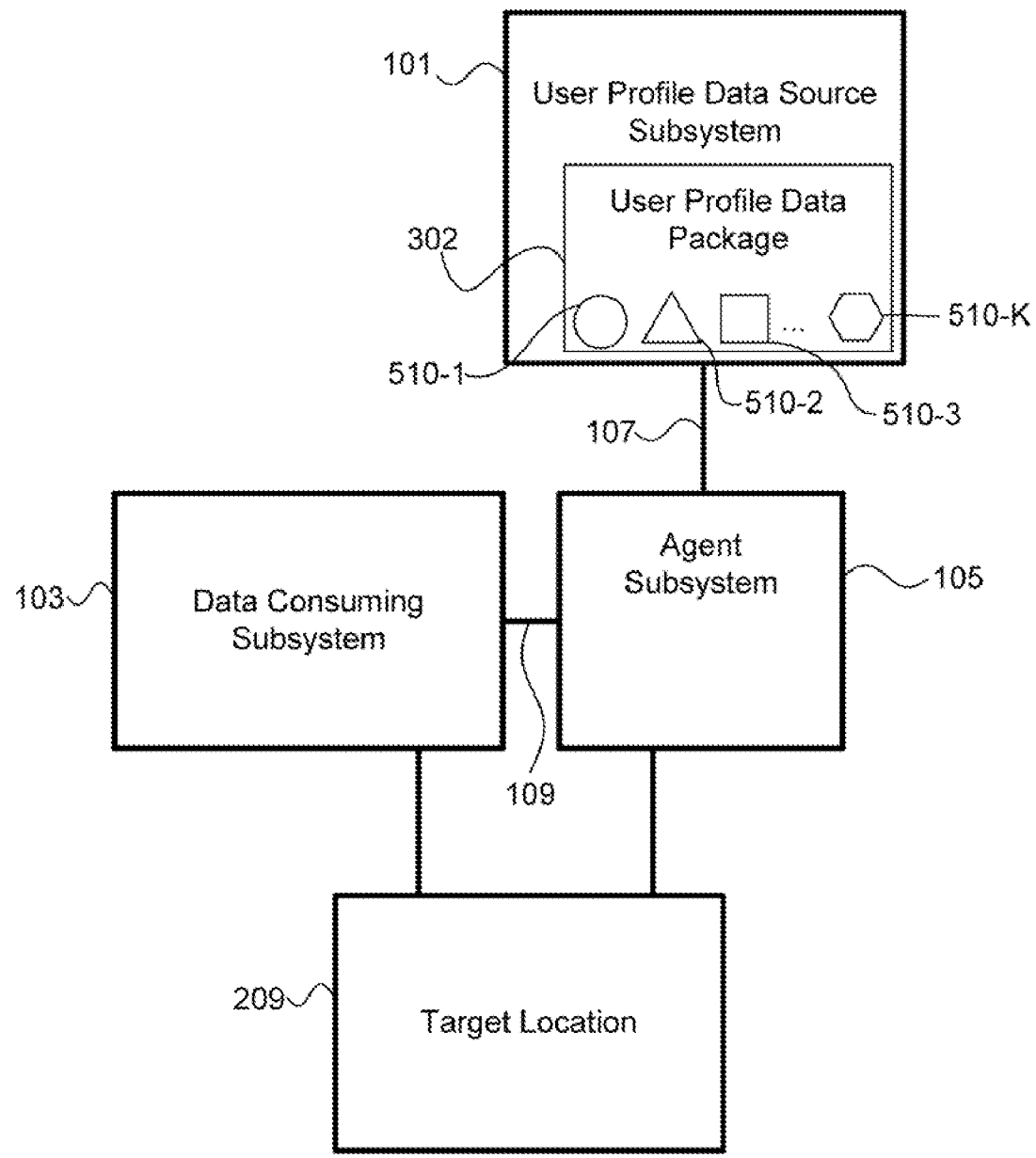
FIGS. 5A-C illustrate different phases of user profile data delivery.
Figure 5B:
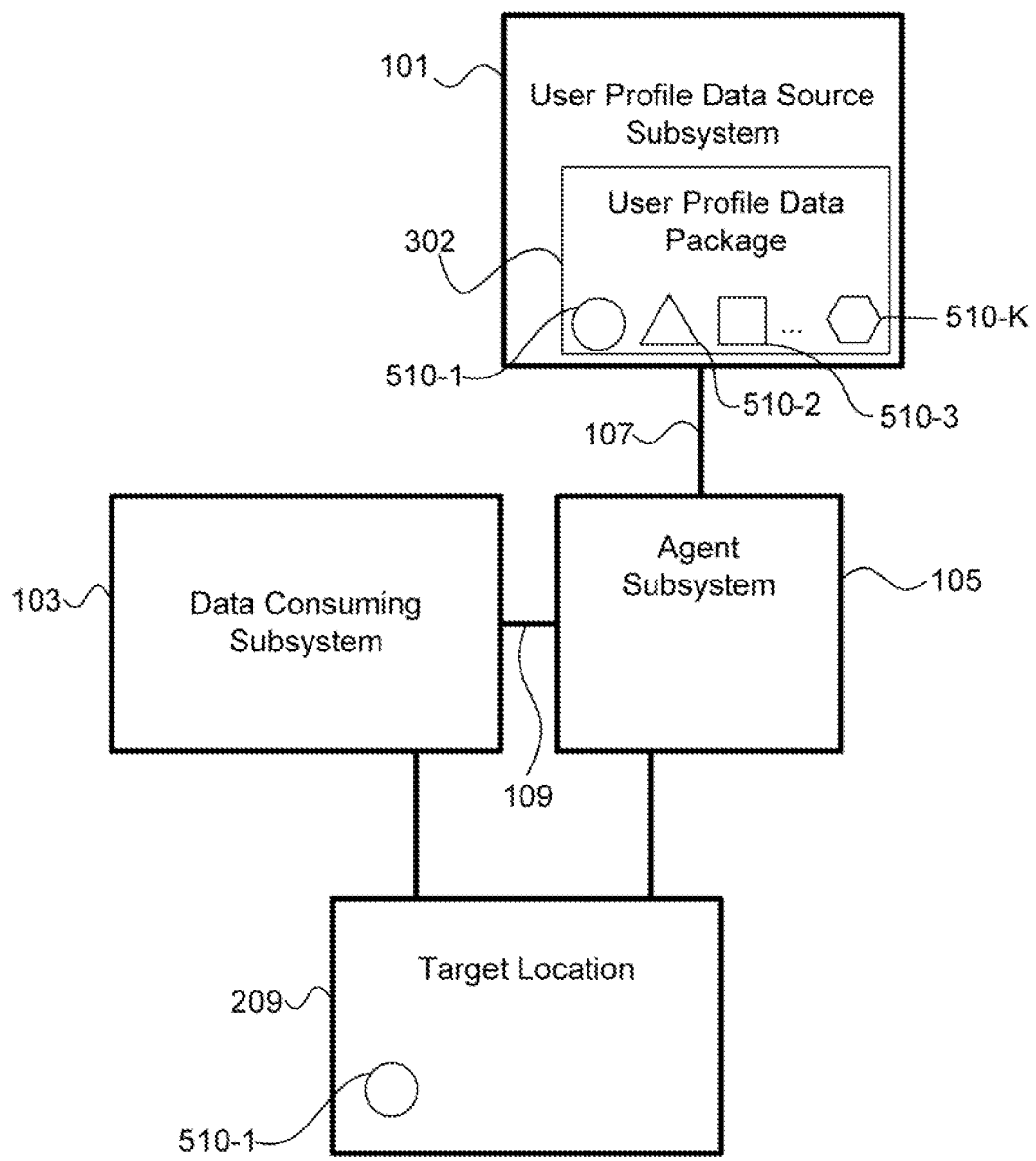
Figure 5C:
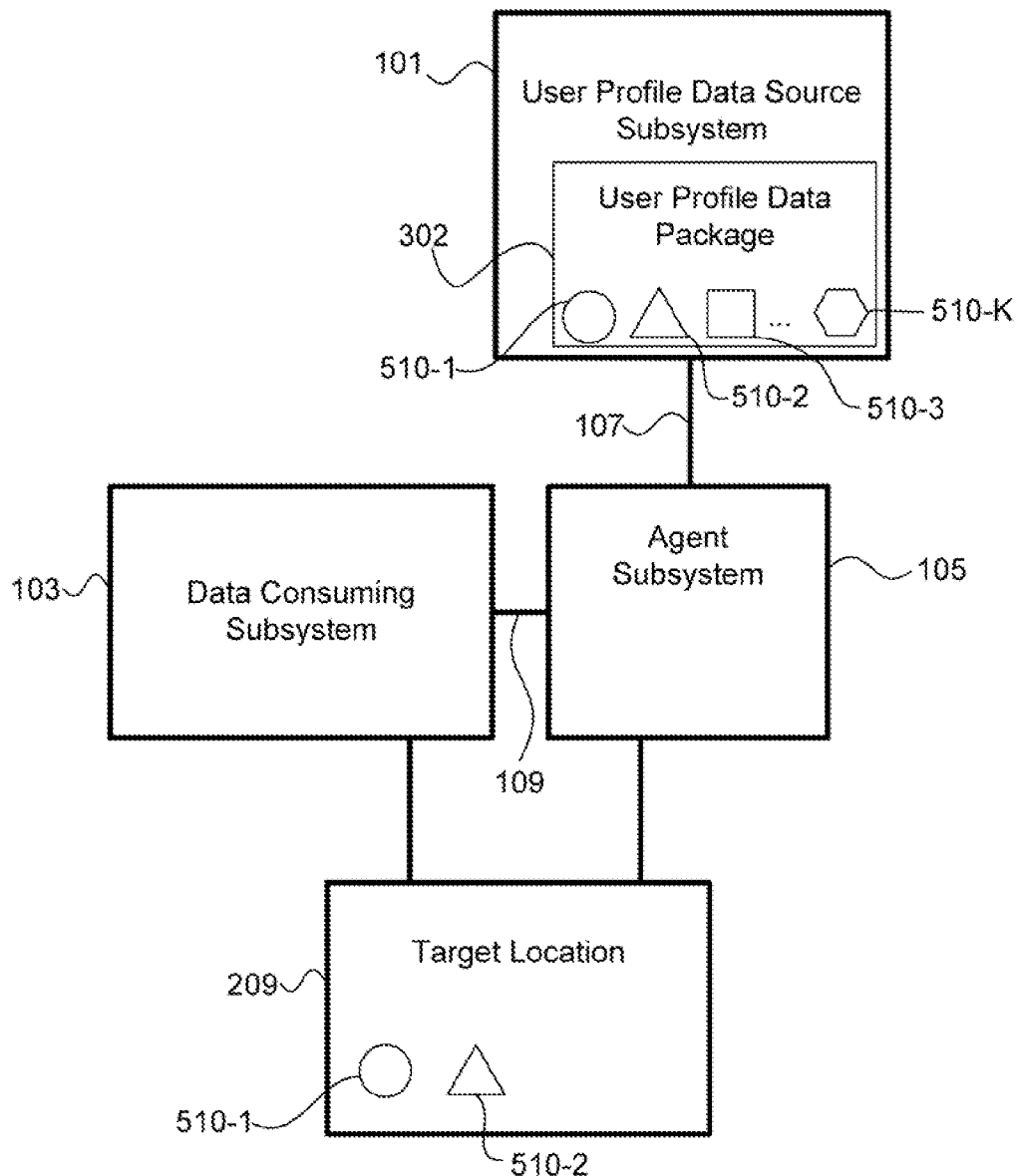

FIGS. 5A-C illustrate various phases of user profile data delivery. In the example shown in FIG. 5A, user profile data source subsystem 101 includes a user profile data package 302 having portions 510-1 through 510-K (collectively "portions 510") included therein. In FIG. 5A, none of the portions 510 has been copied from the user profile data source subsystem 101 to a target location 209 accessible to the data consuming subsystem 103. In FIG. 5B, portion 510-1 has been copied on demand to the target location 209, while other portions 510-2 through 510-K have not been copied to the target location 209. In FIG. 5C, portions 510-1 and 510-2 have been copied on demand to the target location 209, while other portions 510-3 through 510-K have not been copied to the target location 209. Accordingly, various portions 510 of user profile data package 302 may be copied on demand to target location 209 on a portion-by-portion basis as needed to fulfill requests from data consuming subsystem 103 for access to the various portions 510, without having to fully copy the entire user profile data package 302.

Agent subsystem 105 and/or user profile data source subsystem 101 may be configured to predictively prioritize the copying order (e.g., the streaming order) of portions 510 of a user profile data package 302. The predictive prioritization may be based on a record of user profile data usage. For example, agent subsystem 105 may be configured to track and record access requests generated by the data consuming subsystem 103 for portions 510 of the user profile data package 302. The record may be used to identify user data profile usage patterns, which may be used to predict future access requests.

As an example, when a user attempts to logon to an operating subsystem running on computing device 205, the operating system may detect the user logon request and data consuming subsystem 103 may request a full copy of a user profile data package 302. Agent subsystem 105 may function as described above to detect the request, create an illusion that the user profile data package 302 has been fully copied to target location 209, and copy on demand one or more portions 510 of the user profile data package 302 to target location 209. Agent subsystem 105 may track the activity associated with the access requests and/or on-demand copying and utilize a record of the activity to predict future access requests. For instance, when the user attempts to log on to the operating system again in the future, agent subsystem 105 may utilize the record of previous user profile data usage to predict forthcoming access requests. Accordingly, when agent subsystem 105 receives an access request for and provides a copy of portion 510-1 to target location 209 on demand, agent subsystem 105 may predict based on previous user profile data usage that the next access request will likely be for portion 510-2. Agent subsystem 105 may be configured to preemptively fetch portion 510-2 in anticipation of data consuming subsystem 103 generating an access request for portion 510-2.

Agent subsystem 105 may be configured to concurrently fetch multiple portions 510 of user profile data and to prioritize the order (e.g., the streaming order) in which the portions 510 are copied. The prioritization may be based on a record of precious user profile data usage, as described above. Predictive prioritization may help minimize delay times associated with waiting for portions 510 of user profile data to be copied on demand.

In other embodiments, user profile data source subsystem 101 may be configured to predictively prioritize copying order for portions 510 of the user profile data package 302. For example, user profile data source subsystem 101 may be configured to track and record operations associated with providing portions 510 of the user profile data package 302 to agent subsystem 105. Alternatively, agent subsystem 105 may generate a record as describe above and provide the record to the user profile data source subsystem 101. The record may be used to identify user data profile usage patterns, which may be used to predict future access requests.

In certain embodiments, agent subsystem 105 may be configured to facilitate copying of one or more portions 510 of the user profile data package 302 to the target location 209 in the background as other computing operations are being executed by the data consuming subsystem 103. For example, agent subsystem 105 may be configured to utilize available resources (e.g., network resources) to stream portions 510 of user profile data package 302 in the background. Accordingly, these portions 510 may be copied to target location 209 and accessible to data consuming subsystem 103 in advance of being requested by the data consuming subsystem 103. Copying portions of user profile data in the background allows for copying without delaying the performance of computing operations dependent on user profile data. Agent subsystem 105 may be configured to prioritize on-demand requests for portions 510 of user profile data over background copying of user profile data.

Agent subsystem 105 may be configured to maintain a record of copied portions of a user profile data package 302 and to utilize the record to determine, in response to an access request, whether to allow the access request to go through when the requested portion is already stored at target location 209 or to first fetch the requested portion 510 from the user profile data source subsystem 101 before allowing the access request to go through.

Agent subsystem 105 may be configured to support portion-by-portion copying of user profile data for user logoff operations. When a user logs off of an operating system running on computing device 205, data consuming subsystem 103 may perform one or more logoff operations, including initiating copying of a copied user profile data package 302 from target location 209 to the user profile data source subsystem 101 for storage. Accordingly, any modifications to the copied user profile data package 302 may be propagated to the user profile data source subsystem 101 and included in the stored user profile data package 302 at the user profile data source subsystem 101. Agent subsystem 105 may be configured to detect and intercept such a reverse copy request from the data consuming subsystem 103 to copy the user profile data package 302 from the target location 209 to the user profile data source subsystem 101. The detection and interception may include interfacing with an operating system copy process as described above. Agent subsystem 105 may create an illusion that the user profile data package 302 has been fully copied from the target location 209. This may be performed in any of the ways described above, including agent subsystem 105 providing a deceptive indication to the data consuming subsystem 103 indicating that reverse copy request has been fulfilled (i.e., the user profile data package 302 has been fully copied).

Agent subsystem 105 may be configured to identify any modifications that have been made to the copied user profile data package 302 and to copy only the modified portion(s) from the target location 209 to the user profile data source subsystem 101. This can significantly minimize a delay that would otherwise occur if the entire user profile data package 302 were copied to the user profile data source subsystem 101.

As described above, reverse copying of one or more portions of user profile data from the target location 209 to the user profile data source subsystem 101 may be performed in response to a reverse copy request in relation to a user logoff request. Additionally or alternatively, agent subsystem 105 may detect a modification to the copied user profile data package 302 and copy only the modified portion of the user profile data package 302 from the target location 209 to the user profile data source subsystem 101 when predefined resources are available. Predefined resources may include predetermined network bandwidth availability, free processing cycles, and/or any other measure of computing resources. The predefined resources, including threshold levels for the resources, may be defined in advance and detected and utilized by agent subsystem 105 to selectively reverse copy user profile data modifications from target location 209 to the user profile data source subsystem 101.

Figure 6:
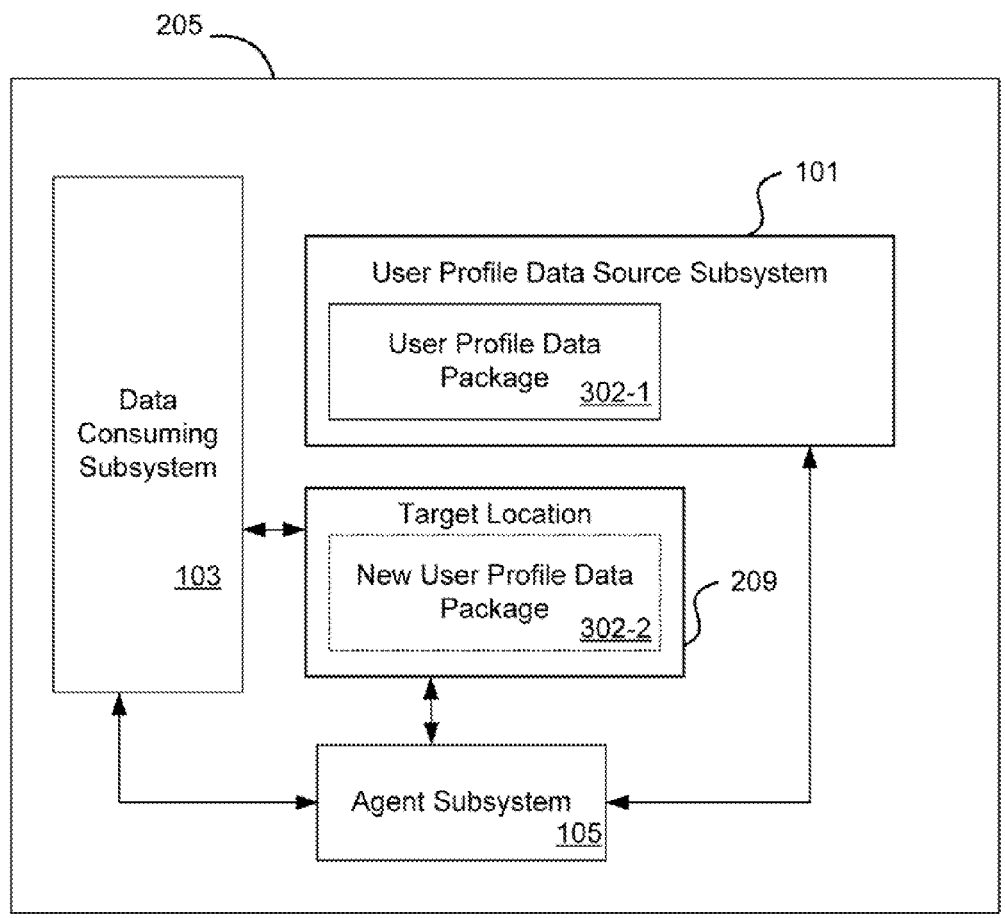
FIG. 6 illustrates another exemplary implementation of a system for user profile data delivery.

While the above examples have been described in reference to certain exemplary implementations of system 100, other implementations of system 100 may be employed according to the principles described herein. For example, while FIG. 2 illustrates an implementation 200 including user profile data source subsystem 101 configured to communication with computing devices 205 over a network connection 207, system 100 may be implemented in other ways, including locally within a computing device 205. FIG. 6 illustrates an exemplary local implementation of system 100 including user profile data source subsystem 101, data consuming subsystem 103, and agent subsystem 105 implemented on a computing device 205.

The implementation shown in FIG. 6 may support local on-demand copying of portions of user profile data. For example, FIG. 6 illustrates computing device 205 as including the user profile data source subsystem 101 storing a user profile data package 302-1. A user of computing device 205 may attempt to generate a new user profile, and data consuming subsystem 103 may consequently generate a request to copy the existing user profile data package 302-1 (e.g., a default user profile directory) as a template for a new user profile data package 302-2. Agent subsystem 105 may detect and intercept the request, create an illusion that a full copy of the user profile data package 30-21 has been made as user profile data package 302-2 at target location 209, and copy on demand one or more portions of the user profile data package 302-1 to the new user profile data package 302-2 at target location 209. Accordingly, one or more portions of a user profile data package 302-1 may be copied locally on demand, and computing operations dependent on the copied portions can be performed, without the entire contents of the user profile data package 302-1 being fully copied to the new user profile data package 302-2. Additionally or alternatively, portions of the user profile data package 302-1 may be copied to the new user profile data package 302-2 in the background.

In certain embodiments, agent subsystem 105 may be configured to operate transparently to the data consuming subsystem 103. For example, agent subsystem 105 may be configured to intercept requests from the data consuming subsystem 103, create illusions that requests have been or are being fulfilled, fetch user profile data, allow intercepted requests to go through when the corresponding data has been fetched, and perform any other on-demand user profile data copying operations without the data consuming subsystem 103 being aware of the agent subsystem 105 or its operations. Accordingly, in certain embodiments, agent subsystem 105 may comprise an aftermarket addition configured to interface with data consuming subsystem 103 in a transparent manner.

Figure 7:
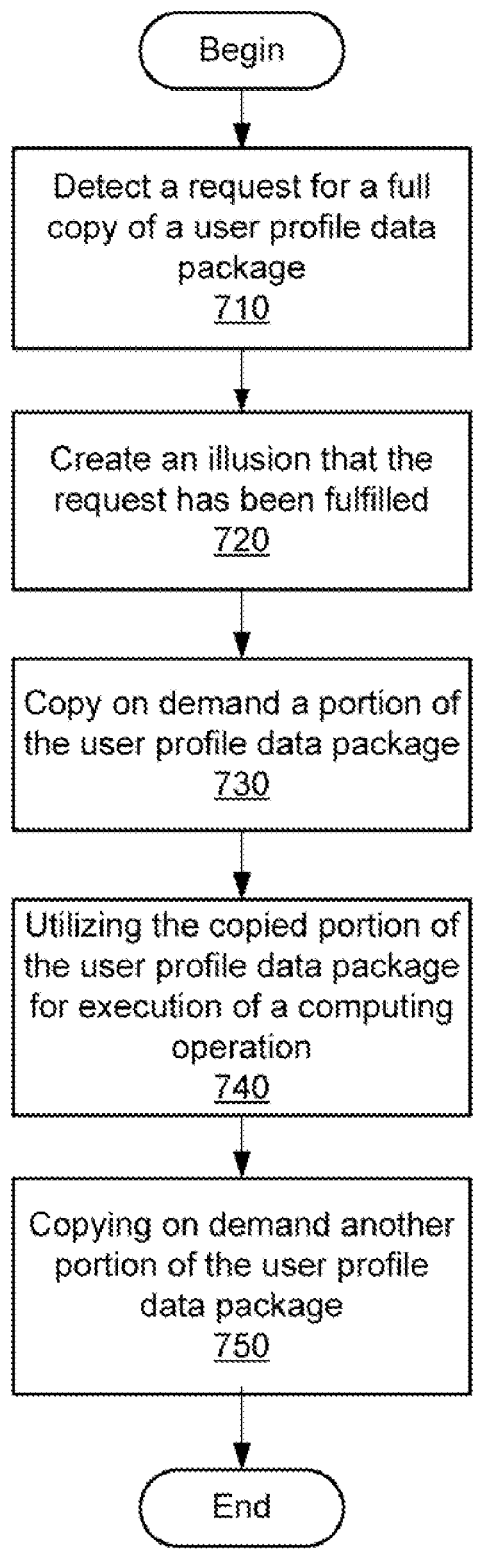
FIG. 7 illustrates an exemplary method of user profile data delivery.

FIG. 7 illustrates an exemplary method of user profile data delivery. While FIG. 7 illustrates exemplary steps according to one embodiment, other embodiments may omit, add to, reorder, and/or modify any of the steps shown in FIG. 7.

In step 710, a request for a full copy of a user profile data package 302 is detected. Step 710 may be performed in any of the ways described above, including agent subsystem 105 detecting a request from data consuming subsystem 103 for a full copy of a user profile data package 302 maintained by the user profile data source subsystem 101. As described above, such a request may be generated in response to a user logon attempt.

In step 720, an illusion is created that the requested has been fulfilled. Step 720 may be performed in any of the ways described above, including agent subsystem 105 providing a deceptive indication to the data consuming subsystem 103 indicating that a full copy of the user profile data package 302 has been received, i.e., that copying is complete or there is no further user profile data to be copied. In certain embodiments, step 720 may include copying shell data for the user profile data package 302 to a target location 209.

In step 730, a portion of the user profile data package 302 is copied on demand. Step 730 may be performed in any of the ways described above, including agent subsystem 105 intercepting an access request for the portion of the user profile data package 302, fetching a copy of the requested portion of the user profile data package 302 from the user profile data source subsystem 101, and providing the copied portion to fulfill the access request (e.g., by storing the copied portion to a target location 209).

In step 740, the copied portion of the user profile data package is utilized for execution of a computing operation. Step 740 may be performed in any of the ways described above, including the computing operation using the copied portion stored at the target location 209. In certain embodiments, step 740 is performed without the entire contents of the user profile data package 302 being copied to the target location 209.

In step 750, another portion of the user profile data package 302 is copied on demand. Step 750 may be performed in any of the ways described above, including agent subsystem 105 intercepting an access request for the other portion of the user profile data package 302, fetching a copy of the requested other portion of the user profile data package 302 from the user profile data source subsystem 101, and providing the copied other portion to fulfill the access request (e.g., by storing the copied other portion to a target location 209).

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A computer-implemented method for streaming user profiles, at least a portion of the method being performed by a computing device comprising at least one processor, the method comprising:
   detecting a request for a full copy of a user profile data package maintained by a user profile data source subsystem;
   creating an illusion that the request has been fulfilled by:
      copying only a portion of the contents of the user profile data package from the user profile data source subsystem to a target location for access by a data consuming subsystem;
      providing a deceptive indication to the data consuming subsystem;
      copying shell data for the user profile data package from the user profile data source subsystem to the target location;
      enabling the data consuming subsystem to access the portion of the user profile data package prior to copying the remainder of the full copy of the user profile data package to the target location; streaming at least one additional portion of the user profile data package to the target location on an as-needed basis by:
         predictively identifying the additional portion of the user profile data package based at least in part on previous user profile data usage;
         prioritizing the identified additional portion of the user profile data package to be copied to the target location;
         copying the identified additional portion of the user profile data package from the user profile data source subsystem to the target location.

2. The method of claim 1, further comprising:
   initiating execution of a computing operation dependent on the portion of the user profile data package;
   detecting the computing operation requesting the portion of the user profile data package; and
   performing the copying on demand of the portion of the user profile data package from the user profile data source subsystem to the target location in response to the detected computing operation request.

3. The method of claim 1, further comprising utilizing the copied portion of the user profile data package for execution of a computing operation, without fully copying the user profile data package from the user profile data source subsystem to the target location.

4. The method of claim 3, wherein the computing operation includes at least one of a user logon operation and a desktop display operation.

5. The method of claim 1, wherein copying the portion of the user profile data package includes streaming the portion of the user profile data package from the user profile data source subsystem to the target location.

6. The method of claim 1, wherein copying the portion of the user profile data package includes:
   intercepting an access request for the portion of the user profile data package;
   fetching a copy of the portion of the user profile data package from the user profile data source subsystem; and
   providing the copied portion of the user profile data package to fulfill the access request.

7. The method of claim 1, wherein providing the deceptive indication comprises providing an application programming interface ("API") communication to the data consuming subsystem, the API communication falsely confirming that the user profile data package has been fully copied from the user profile data source subsystem.

8. The method of claim 1, further comprising:
   copying a plurality of other portions of the user profile data package from the user profile data source subsystem to the target location; and
   prioritizing the other portions for copy order based on previous user profile data usage.

9. The method of claim 1, further comprising:
   detecting a modification to the copied portion of the user profile data package;
   determining whether predefined resources are available; and
   copying the modified portion of the user profile data package from the target location to the user profile data source subsystem when the predefined resources are determined to be available.

10. The method of claim 1, further comprising:
   modifying the copied portion of the user profile data package;
   detecting a reverse copy request to copy the user profile data package from the target location to the user profile data source subsystem;
   creating an illusion that the reverse copy request has been fulfilled; and copying only the modified portion of the user profile data package from the target location to the user profile data source subsystem.

11. A system for streaming user profiles, comprising:
a user profile data source subsystem maintaining data representative of at least one user profile data package; and
an agent subsystem within a computing device communicatively coupled to the user profile data source subsystem by way of a network, the agent subsystem comprising at least one processor configured to:
  detect a request from a data consuming subsystem within the computing device, the request being for a full copy of the user profile data package maintained by the user profile data source subsystem,
  create an illusion that the user profile data package has been fully copied from the user profile data source subsystem to a target location accessible to the data consuming subsystem by:
    copying only a portion of the contents of the user profile data package from the user profile data source subsystem to the target location;
    providing a deceptive indication to the data consuming subsystem;
    copying shell data for the user profile data package from the user profile data source subsystem to the target location;
    enabling the data consuming subsystem to access the portion of the user profile data package prior to copying the remainder of the full copy of the user profile data package to the target location;
    streaming at least one additional portion of the user profile data package to the target location on an as-needed basis by:
      predictively identifying the additional portion of the user profile data package based at least in part on previous user profile data usage;
      prioritizing the identified additional portion of the user profile data package to be copied to the target location;
      copying the identified additional portion of the user profile data package from the user profile data source subsystem to the target location.

12. The system of claim 11, wherein the data consuming subsystem comprises at least one of an operating system, an operating system copy process, and a user logon operation running on the computing device.

13. The system of claim 11, wherein the agent subsystem is configured to operate transparently to the data consuming subsystem.

14. The system of claim 11, wherein the data consuming subsystem is configured to utilize the copied portion of said user profile data package to execute a computing operation, without the user profile data package being fully copied from the user profile data source subsystem.

15. The system of claim 11, wherein the agent subsystem is configured to:
  intercept an access request from the data consuming subsystem for the portion of the user profile data package;
  fetch a copy of the portion of the user profile data package from the user profile data source subsystem; and
  store the copy of the portion of the user profile data package to the target location for access by the data consuming subsystem to fulfill the access request.

* * * * *